United States Patent [19]
Matsuura et al.

[11] Patent Number: 5,187,762
[45] Date of Patent: Feb. 16, 1993

[54] OPTICAL FERRULE

[75] Inventors: Masami Matsuura, Ama; Hisakazu Okajima, Nishikasugai, both of Japan

[73] Assignee: NGK Insulators, Ltd., Japan

[21] Appl. No.: 849,342

[22] Filed: Mar. 11, 1992

[30] Foreign Application Priority Data

Mar. 18, 1991 [JP] Japan ............................. 3-23346[U]

[51] Int. Cl.⁵ ............................. G02B 6/00; G02B 6/36
[52] U.S. Cl. ..................................................... 385/84
[58] Field of Search ..................................... 385/84–88

[56] References Cited

U.S. PATENT DOCUMENTS

| | | | |
|---|---|---|---|
| 4,422,716 | 12/1983 | Morimoto et al. | 385/84 |
| 4,447,121 | 5/1984 | Cooper et al. | 385/84 X |
| 4,673,242 | 6/1987 | Logan et al. | 385/84 |
| 4,743,084 | 5/1988 | Manning | 385/84 |
| 4,744,621 | 5/1988 | Tanabe et al. | 385/84 |
| 4,875,754 | 10/1989 | Rao et al. | 385/84 |
| 5,029,966 | 7/1991 | Serapins et al. | 385/84 |
| 5,080,460 | 1/1992 | Erdman et al. | 385/84 |

Primary Examiner—Akm E. Ullah
Attorney, Agent, or Firm—Parkhurst, Wendel & Rossi

[57] ABSTRACT

An optical ferrule including a non-metallic sleeve 11 formed with a through bore having a small bore portion 14 and a large bore portion 1. A bare fiber 13 and a coating 15 of an optical fiber 12 are adhesively fixed in the small bore portion and the large bore portion, respectively. The large bore portion 16 has at least one groove 17 formed in the inner surface thereof, the optical fiber has a rough surface portion 20 formed in the coating in at least a portion opposing to the groove, a glass tube 18 is inserted in the large bore portion between the small bore portion and the end face of the coating of the optical fiber and has an outer diameter larger than the inner diameter of the small bore portion and an inner diameter adapted for insertion of the bare fiber, and an adhesive 21 is filled between the components including the inner surface of the sleeve. The optical ferrule has superior reliability, durability and stability.

4 Claims, 1 Drawing Sheet

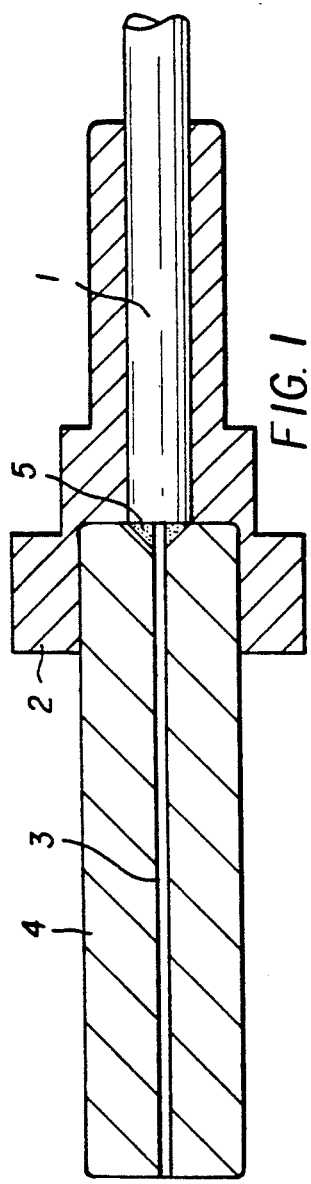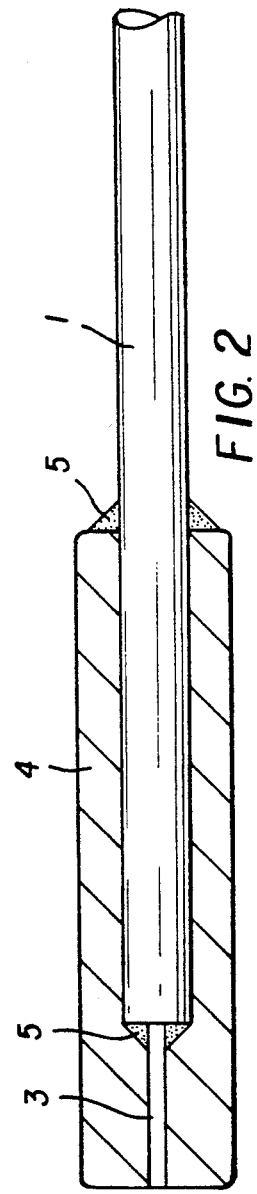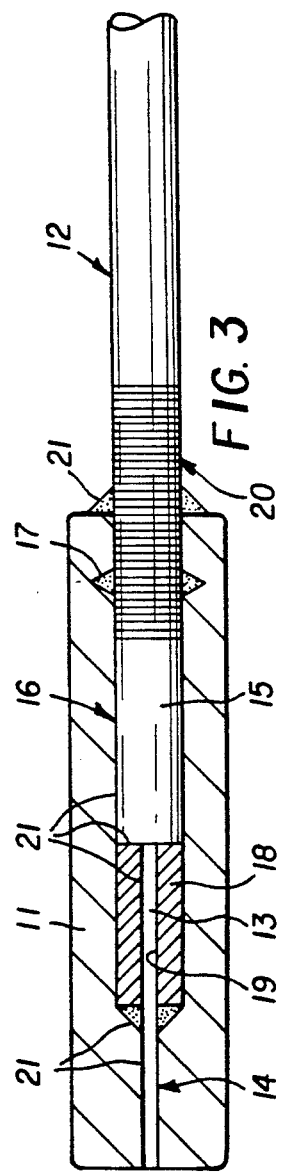

OPTICAL FERRULE

BACKGROUND OF THE INVENTION

The present invention relates to an optical ferrule adapted for use in optical fiber connectors, optical measuring instruments and the like.

Hitherto, such an optical ferrule as shown in FIG. 1 has been known. This optical ferrule is adapted for use in a SC type optical fiber connector and includes a stainless steel collar 2 having a large through bore of a large inner diameter for receiving one end portion of a nylon coated optical fiber 1. The optical ferrule includes a ceramic sleeve 4 press fitted into the large through bore of steel collar 2, sleeve 4 and having a small through bore for receiving an bare optical fiber 3 extending from the end of the nylon coated optical fiber. The nylon coated optical fiber 1 and the bare fiber 3 are fixed to the stainless steel collar 2 and the ceramic sleeve 4 by an adhesive 5, respectively.

An optical ferrule of another type as shown in FIG. 2 has been proposed. In this optical ferrule, a nylon coated optical fiber 1 and its bare fiber 3 are inserted into a ceramic sleeve 4 without use of a stainless collar and fixed to the sleeve 4 by an adhesive 5.

However, when the optical ferrule shown in FIG. 1 is utilized with an optical electromagnetic measuring instrument, measurements are adversely affected by the stainless steel collar thereby reducing accuracy. Furthermore, the stainless steel collar 2 may corrode over a period of time thereby decreasing durability and reliability. Furthermore, the sleeve and the nylon coated optical fiber which are forcedly inserted into the stainless steel collar, may come out of the collar when the collar is expanded at a high temperature.

The optical ferrule shown in FIG. 2 does not have no disadvantages mentioned above such as deterioration of measurement accuracy and lack of durability owing to corrosion, since a stainless steel collar is not provided. But, in the arrangement as shown in FIG. 2, if the nylon coated optical fiber 1 repeatedly expands and contracts from temperature variations, the bare fiber 3 is extended from and retracted into the sleeve 4 or is broken down and comes out of the sleeve 4, thus decreasing reliability.

SUMMARY OF THE INVENTION

It is an object of the invention to provide an improved optical ferrule which is always usable in a stable condition without deterioration of measurement accuracy, durability and reliability.

In order to accomplish the aforementioned object of the invention, an optical ferrule according to the invention includes a non-metallic sleeve formed with a through bore having two successive large inner diameter and a small inner diameter portion. A coated optical fiber is inserted in the large bore portion and a bare fiber is inserted in the small bore portion. The coated optical fiber and the bare fiber are fixed in the individual bore portions by an adhesive, wherein the large bore portion has a circumferential groove formed in the inner surface thereof. The coated optical fiber has a rough surface formed in at least a coated portion opposing the groove. A glass tube is inserted between bottom of the large bore portion and the end face of coating of the coated optical fiber in the large bore portion for receiving a portion of the bare fiber extending from the end face of the coated optical fiber and adhesive is filled between the components including the inner surface of the through bore in the sleeve.

With the aforementioned arrangement, the groove formed in the inner surface of the large bore portion of the sleeve and the rough surface portion formed in the coating of the optical fiber in at least a portion opposing the groove can greatly increase an adhesive force between the optical fiber and the large bore portion of the sleeve to thereby prevent the optical fiber from coming out of the sleeve. The glass tube having an outer diameter larger than the inner diameter of the small bore portion is inserted in the larger bore portion between the small bore portion and the end face of the coating of the optical fiber to restrict any expansion of the optical fiber in the axial direction thereby restraining protrusion of the bare fiber caused by the expansion.

The invention will be more fully understood by referring to the following detailed description and claims taken in connection with the accompanying drawings.

BRIEF DESCRIPTION OF THE DRAWINGS

FIG. 1 is a longitudinal sectional view of a conventional optical ferrule;

FIG. 2 is a longitudinal sectional view of another conventional optical ferrule; and FIG. 3 is a longitudinal sectional view of an embodiment of the present invention.

DESCRIPTION OF THE PREFERRED EMBODIMENTS

FIG. 3 shows a longitudinal section of a preferred embodiment of the ferrule according to the invention. A sleeve 11 is made of a non-metallic material such as ceramics, plastics or the like and comprises a small bore portion 14 for adhesively holding a bare fiber 13 of a nylon coated optical fiber 12 and a large bore portion 16 for adhesively holding a nylon coating 15. The large bore portion 16 has a circumferential groove 17 formed in the inner surface thereof. The sleeve 11 is preferably made of ceramics such as alumina, zirconia and plastics such as liquid crystal polymer. The groove 17 may be in the form of a V-shaped groove, rectangular-shaped groove, spirally-shaped groove or the like. A plurality of grooves may be provided.

A glass tube 18 having an outer diameter larger than the inner diameter of the small bore portion 14 is inserted, along with the coated optical fiber 12, in the large bore portion 16 of the sleeve 11. The bare fiber 13 of the optical fiber 12 is extended through a bore 19 of the glass tube 18 and into the small bore portion 14. Bare fiber 13 terminates at the end face of the sleeve and the end face of the coating 15 is abutted against the end face of the glass tube 18.

The coated optical fiber 12 has a rough surface portion 20 formed in a surface portion of the coating 15 opposing the groove 17 which is adjacent to the end of the large bore portion 16 of the sleeve. In this embodiment, the rough surface portion 20 has a roughness corresponding to a lapping film #150 (grain size of 100 μm) and has a circumferential roughing direction, crossing perpendicularly to the longitudinal direction of the optical fiber 12.

The sleeve 11, the glass tube 18, the bare fiber 13 and the coating 15 of the optical fiber 12 are fixed to each other by adhesive 21 which is filled between these components. The end portion having the large bore portion 16 of the sleeve 11 and the coating 15 having the rough surface portion 20 are also adhered to each other by the adhesive 21.

In manufacturing of the optical ferrule shown in FIG. 3, firstly the glass tube 18 is inserted in the sleeve 11 and then the optical fiber 12 is inserted through the sleeve 11 and the glass tube 18 such that the bare fiber 13 is slightly protruded from the end face of the sleeve 11 through the small bore portion 14. The nylon coated optical fiber 12 is preliminarily formed with the rough surface portion 20 in the nylon coating 15. The nylon coating and a primary at the tip portion of the optical fiber are removed to provide the bare fiber 13.

Secondly, the adhesive 21, for example heat-curing epoxy adhesive which has been compounded and then deaerated in a vacuum, is sucked into the sleeve 11 to fill spaces or gaps between the components and the inner surface of the sleeve 11 and between the end portion of the large bore portion 16 of the sleeve and the coating 15 having the rough surface portion 20 with the adhesive.

After confirming that the adhesive 21 is fully filled in the spaces, the adhesive 21 is dried at 80° C. for sixty minutes to be cured. Finally, the bare fiber 13 protruding from the small bore portion 14 is cut and then the end faces of the sleeve and the bare fiber are polished.

The optical ferrules according to the embodiment shown in FIG. 1 of the invention and optical ferrules prepared as comparative examples are tested to evaluate separation states at adhered portions after a heat cycle test and under a load of 1.5 kg at −25° C. The test results are shown in the following Table. The comparative example 1 has a construction as shown in FIG. 1, but includes a coated optical fiber formed with a rough surface portion 20 having a roughing direction parallel to the longitudinal direction of the optical fiber 12, the comparative example 2 has the construction as shown in FIG. 1, but has no rough surface portion 20, and the comparative example 3 has the same construction as shown in FIG. 2.

In the Table, the denominator denotes the number of samples and the numerator denotes the number samples which had separation. The heat cycle A performs one cycle by keeping the ferrule at a normal temperature for ten minutes, at 85° C. for thirty minutes, at a normal temperature for ten minutes, and at −40° C. for thirty minutes. The heat cycle B performs one cycle by keeping the ferrule at a normal temperature for ten minutes, at 80° C. for thirty minutes, at a normal temperature for ten minutes and at −25° C. for thirty minutes.

TABLE

|  | Heat cycle A after 274 cycles | Heat cycle B after 40 cycles | Under load of 1.5 kg at −25° C. |
| --- | --- | --- | --- |
| Invention | 0/10 | — | 0/3 |
| Comparative Example 1 | 5/10 | — | — |
| Comparative Example 2 | 10/10 | 0/3 | 0/3 |
| Comparative Example 3 | — | 1/3 | 0/3 |

It is seen from the above test results that the adhered portion is effectively prevented from separating under a condition subjected to heat cycles and to a load of 1.5 kg at −25° C. when the roughing direction of the rough surface portion 20 opposes longitudinal direction of the optical fiber 12.

It is understood that the present invention is not limited to the aforementioned embodiment, but it is possible to make various modifications and variations in the arrangement. For example, the roughing direction of the rough surface portion may also be at an angle with respect to the longitudinal direction of the optical fiber, as long as the roughing direction is not in parallel to the longitudinal direction of the optical fiber.

According to the present invention, the adhesion force between the optical fiber and the sleeve is increased by forming the groove in the inner surface of the sleeve to be adhered to the coating of the coated optical fiber and forming the rough surface in the coating portion opposite the groove. Furthermore, the glass tube inserted in the sleeve can effectively prevent separating of the adhered portions, protruding and withdrawing of the bare fiber from the end surface of the sleeve, breaking down of the optical fiber, and separating of the optical fiber from the sleeve due to expansion and shrinkage of the optical fiber caused by temperature variation.

According to the invention, since the ferrule has no metallic components measurement accuracy is not deteriorated when used in optical electromagnetic measuring instruments, and also deterioration of durability owing to corrosion is not a problem. Therefore, the ferrule of the invention is superior in reliability and durability and can be always used in stable condition.

What is claimed is:

1. An optical ferrule comprising a non-metallic sleeve formed with a through bore having a small bore portion in which is inserted a bare fiber extending from a coated optical fiber and a large bore portion in which is inserted the coated optical fiber, said large bore portion having at least one groove formed in the inner surface thereof, the optical fiber having a rough surface portion formed along an outer surface of the coated optical fiber along at least a portion opposite the groove, further comprising a glass tube inserted in the large bore portion between the small bore portion and the end face of a coating of the coated optical fiber, the glass tube having an outer diameter larger than the inner diameter of the small bore portion, the glass tube having an inner diameter adapted for receiving the bare fiber therein, and an adhesive filled between the sleeve and the glass tube, between the sleeve and the bare fiber, and between the sleeve and coating of the coated optical fiber.

2. The optical ferrule of claim 1, wherein the rough surface portion has a roughing direction which forms an angle with respect to the longitudinal direction of the optical fiber.

3. The optical ferrule of claim 1, wherein the non-metallic sleeve is made of ceramic.

4. The optical ferrule of claim 1, wherein the non-metallic sleeve is made of plastic.

* * * * *